United States Patent
Yoshimoto et al.

(10) Patent No.: US 9,306,774 B2
(45) Date of Patent: Apr. 5, 2016

(54) COMMUNICATION APPARATUS

(71) Applicant: DENSO CORPORATION, Kariya, Aichi-pref. (JP)

(72) Inventors: Takahisa Yoshimoto, Kariya (JP); Hironobu Akita, Okazaki (JP)

(73) Assignee: DENSO CORPORATION, Kariya (JP)

( * ) Notice: Subject to any disclaimer, the term of this patent is extended or adjusted under 35 U.S.C. 154(b) by 5 days.

(21) Appl. No.: 14/511,220

(22) Filed: Oct. 10, 2014

(65) Prior Publication Data
US 2015/0131765 A1  May 14, 2015

(30) Foreign Application Priority Data
Nov. 11, 2013 (JP) .................. 2013-233275

(51) Int. Cl.
*H03K 7/02* (2006.01)
*H04L 25/03* (2006.01)
*H04B 14/02* (2006.01)

(52) U.S. Cl.
CPC ........ *H04L 25/03006* (2013.01); *H04B 14/023* (2013.01)

(58) Field of Classification Search
CPC .......... H04B 3/23; H04B 3/32; H04B 14/023; H04L 5/14; H04L 25/03197; H04L 25/497; H04L 25/0202; H04L 25/03006
USPC .................. 375/341, 346, 350, 353
See application file for complete search history.

(56) References Cited

U.S. PATENT DOCUMENTS

| | | | |
|---|---|---|---|
| 6,201,796 B1 | 3/2001 | Agazzi et al. | |
| 6,212,225 B1 | 4/2001 | Agazzi | |
| 6,236,645 B1 * | 5/2001 | Agazzi ........................ | 370/286 |
| 6,584,159 B1 * | 6/2003 | Azadet ..................... | H04B 3/23 370/290 |
| 6,992,609 B1 * | 1/2006 | Zelenin et al. ................ | 341/144 |
| 2003/0007581 A1 * | 1/2003 | Agazzi et al. ................ | 375/341 |
| 2003/0086515 A1 * | 5/2003 | Trans et al. ................... | 375/346 |
| 2006/0160516 A1 * | 7/2006 | Zeng et al. .................... | 455/293 |
| 2007/0146042 A1 | 6/2007 | Tsuchi et al. | |
| 2007/0262934 A1 | 11/2007 | Fujikawa et al. | |
| 2011/0064174 A1 * | 3/2011 | Huang ..................... | H04B 3/23 375/350 |

FOREIGN PATENT DOCUMENTS

JP   2006-235118 A   9/2006

* cited by examiner

*Primary Examiner* — Syed Haider
(74) *Attorney, Agent, or Firm* — Posz Law Group, PLC

(57) ABSTRACT

A communication apparatus encodes a transmission target data according to a PAM5 mode to generate PAM signals, applies a pulse shaping to the generated PAM signals with a pulse shaping filter to provide pulse-shaped PAM signals, and inputs the pulse-shaped PAM signals into a digital-analog converter. The pulse shaping filter designates a transfer function $G(z)$ as $G1(z)=0.667+0.333z^{-1}$ that is approximated to $G0(z)=(2/3)+(1/3)z^{-1}$.

5 Claims, 6 Drawing Sheets

PREVIOUS INPUT

| PRESENT INPUT | | -2 | -1 | 0 | 1 | 2 |
|---|---|---|---|---|---|---|
| | -2 | -2 | -1.667 | -1.333 | -1 | -0.667 |
| | -1 | -1.333 | -1 | -0.667 | -0.333 | 0 |
| | 0 | -0.667 | -0.333 | 0 | 0.333 | 0.667 |
| | 1 | 0 | 0.333 | 0.667 | 1 | 1.333 |
| | 2 | 0.667 | 1 | 1.333 | 1.667 | 2 |

13 LEVELS

⇧

$G(z) = 0.75 + 0.25z^{-1}$

PREVIOUS INPUT

| PRESENT INPUT | | -2 | -1 | 0 | 1 | 2 |
|---|---|---|---|---|---|---|
| | -2 | -2 | -1.75 | -1.5 | -1.25 | -1 |
| | -1 | -1.25 | -1 | -0.75 | -0.5 | -0.25 |
| | 0 | -0.5 | -0.25 | 0 | 0.25 | 0.5 |
| | 1 | 0.25 | 0.5 | 0.75 | 1 | 1.25 |
| | 2 | 1 | 1.25 | 1.5 | 1.75 | 2 |

17 LEVELS

|  | \multicolumn{5}{c}{PREVIOUS INPUT} |
|---|---|---|---|---|---|
| PRESENT INPUT | | -2 | -1 | 0 | 1 | 2 |
| | -2 | -2 | -1.5 | -1 | -0.5 | 0 |
| | -1 | -1.5 | -1 | -0.5 | 0 | 0.5 |
| | 0 | -1 | -0.5 | 0 | 0.5 | 1 |
| | 1 | -0.5 | 0 | 0.5 | 1 | 1.5 |
| | 2 | 0 | 0.5 | 1 | 1.5 | 2 |

9 LEVELS

| | | PREVIOUS INPUT | | |
|---|---|---|---|---|
| | | -1 | 0 | 1 |
| PRESENT INPUT | -1 | -1 | -0.667 | -0.333 |
| | 0 | -0.333 | 0 | 0.333 |
| | 1 | 0.333 | 0.667 | 1 |

7 LEVELS $G(z) = 0.75 + 0.25z^{-1}$

| | | PREVIOUS INPUT | | |
|---|---|---|---|---|
| | | -1 | 0 | 1 |
| PRESENT INPUT | -1 | -1 | -0.75 | -0.5 |
| | 0 | -0.25 | 0 | 0.25 |
| | 1 | 0.5 | 0.75 | 1 |

9 LEVELS

|  |  | PREVIOUS INPUT | | | |
|---|---|---|---|---|---|
| | | -3 | -1 | 1 | 3 |
| PRESENT INPUT | -3 | -3 | -2.333 | -1.667 | -1 |
| | -1 | -1.667 | -1 | -0.333 | 0.333 |
| | 1 | -0.333 | 0.333 | 1 | 1.667 |
| | 3 | 1 | 1.667 | 2.333 | 3 |

10 LEVELS

COMMUNICATION APPARATUS

CROSS REFERENCE TO RELATED APPLICATION

The present application is based on Japanese Patent Application No. 2013-233275 filed on Nov. 11, 2013, the disclosure of which is incorporated herein by reference.

TECHNICAL FIELD

The present disclosure relates to a communication apparatus.

BACKGROUND ART

Patent Literature 1: JP 2005-168047 A

There is conventionally known a communication apparatus that communicates with an external apparatus by generating communication signals according to a PAM (Pulse Amplitude Modulation) mode. One of PAM modes is PMA5 that encodes informational signals into five levels of values. Demodulating is performed by detecting the corresponding voltage levels of the reception signals on the basis of a period of each symbol.

PAM5 mode is adopted in 100BASE-T2 that is a standard of 100-megabit Ethernet (registered trademark) or 1000BASE-T that is a standard of gigabit Ethernet. According to 100BASE-T2, a 4-bit data is encoded into two PAM signals each of which indicates five different levels of values, and the two PAM signals are transmitted to an external apparatus via the respective two transmission lines.

In addition, 4D-PAM5 mode is adopted in 1000BASE-T. According to 1000BASE-T, an 8-bit data is encoded into four PAM signals each of which indicates five different levels of values, and the four PAM signals are transmitted to an external apparatus via the respective four transmission lines.

Another PAM mode is PAM3/4/16 mode that encodes informational signals into 3/4/16 different levels of values. PAM16 mode is adopted in 10GBASE-T that is a standard of 10 gigabit Ethernet.

In addition, in order to reduce inter-symbol interference (ISI) or electromagnetic interference (EMI), a signal transmission according to PAM modes transmits PAM signals into a transmission line via a pulse shaping filter. According to 100BASE-T2, for example, the pulse shaping filter whose transfer function is $H(z)=0.75+0.25z^{-1}$ (i.e., $H(z)=0.75+0.25z^{-1}$) permits pulse shaping of PAM signals from the physical coding sublayer; the PAM signals after the pulse shaping are converted into the analog signals through a digital-analog converter. The analog signals are sent out into the transmission line via a hybrid circuit (refer to Patent Literature 1).

Incidentally, the bit number (gradation number) of a digital-analog converter located in the latter stage of a pulse shaping filter affects the magnitude of the circuit. According to a pulse shaping filter of which the number of taps is 2, an output value is determined by a combination of an input value at the present time and an input value at the previous time. Therefore, when PAM signals according to PAM5 mode are inputted into the pulse shaping filter, the output values from the pulse shaping filter become 5×5=25 kinds at the maximum. It is noted that the output values become an identical kind depending on the combination of input values. In this case, the output values of the pulse shaping filter whose transfer function is $H(z)=0.75+0.25z^{-1}$ indicate 17 kinds of values.

When the output values of the pulse shaping filter provide 17 kinds, the bit number (gradation number) of the digital-analog converter necessary for the latter stage of the pulse shaping filter is equal to or greater than 5 bits, which is still the same as that when the output values of the pulse shaping filter provide 25 kinds. In addition, the pulse shaping filter using the above transfer function $H(z)$ still has room for improvement in the respect of the reduction effect of EMI in pulse shaping.

SUMMARY

It is an object of the present disclosure to provide a technology that permits a communication apparatus generating PAM signals as transmission signals to provide suitable pulse shaping of PAM signals.

To achieve the above object, according to a first example of the present disclosure, a communication apparatus is provided to include the following. A generation unit is included to generate PAM (Pulse Amplitude Modulation) signals that indicate a plurality of different levels of values corresponding to data of a transmission target. A pulse shaping filter is included to receive an input that is the PAM signals generated by the generation unit and provide an output that is pulse-shaped PAM signals that correspond to the input of the PAM signals from the generation unit. A converter is included to convert the pulse-shaped PAM signals from the pulse shaping filter into analog signals and provide the analog signals to a transmission line connected to an external apparatus. The pulse shaping filter provides the output that is the pulse-shaped PAM signals corresponding to the input of the PAM signals from the generation unit according to a first input and output relation or a second input and output relation. The first input and output relation is provided by a transfer function $G(z)=(2/3)+(1/3)z^{-1}$ ($z^{-1}$ being a delay operator), whereas the second input and output relation is equivalent to the first input and output relation provided by the transfer function $G(z)=(2/3)+(1/3)z^{-1}$. In other words, the pulse shaping filter applies pulse shaping to the PAM signals from the generation unit to provide pulse-shaped PAM signals by adopting either a transfer function $G(z)=(2/3)+(1/3)z^{-1}$ ($z^{-1}$ being a delay operator) or a different transfer function that provides an input and output relation equivalent to that of the transfer function $G(z)=(2/3)+(1/3)z^{-1}$.

That is, the above configuration according to the first example includes a pulse shaping filter adopting a transfer function $G(z)=(2/3)+(1/3)z^{-1}$, or an input and output relation equivalent to an input and output relation provided by the transfer function $G(z)=(2/3)+(1/3)z^{-1}$. The above configuration provides an advantageous effect to reduce the number of output values from the pulse shaping filter as compared with a conventional configuration adopting a transfer function $H(z)=0.75+0.25z^{-1}$.

The above configuration can thus reduce the bit number of a digital-analog converter and the magnitude of a circuit of the communication apparatus. Further, the above configuration can reduce a peak level of an isolated pulse, and reduce EMI as compared with the conventional configuration. Therefore, according to the above configuration, the communication apparatus can be configured to provide suitable pulse shaping of PAM signals as compared with a conventional configuration or technology.

In addition, according to a second example of the present disclosure, the pulse shaping filter may adopt an input and output relation meeting a transfer function $G(z)=0.5+0.5z^{-1}$, or an input and output relation equivalent to that of the transfer function $G(z)=0.5+0.5z^{-1}$. Similarly, the communication apparatus according to the second example can be configured to provide suitable pulse shaping of PAM signals as compared with the conventional configuration.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Hereafter, description will be given to an embodiment of the present disclosure with reference to the drawings.

First Embodiment

The first embodiment is directed to a communication apparatus 1 that has a physical layer according to a standard of gigabit Ethernet (registered trademark). The communication apparatus 1 encodes transmission target data generated in the data link layer on the basis of 8 bits (every 8 bits) into a four dimensional 5 level symbol constellation ($5^4 = 5^4 = 625$), and transmits four PAM (Pulse Amplitude Modulation) signals corresponding to the symbol constellation to an external apparatus via four transmission lines 40. The transmission line 40 includes twisted-pair cables. The transmission target data is a so-called MAC (Media Access Control) frame.

Figure 1:
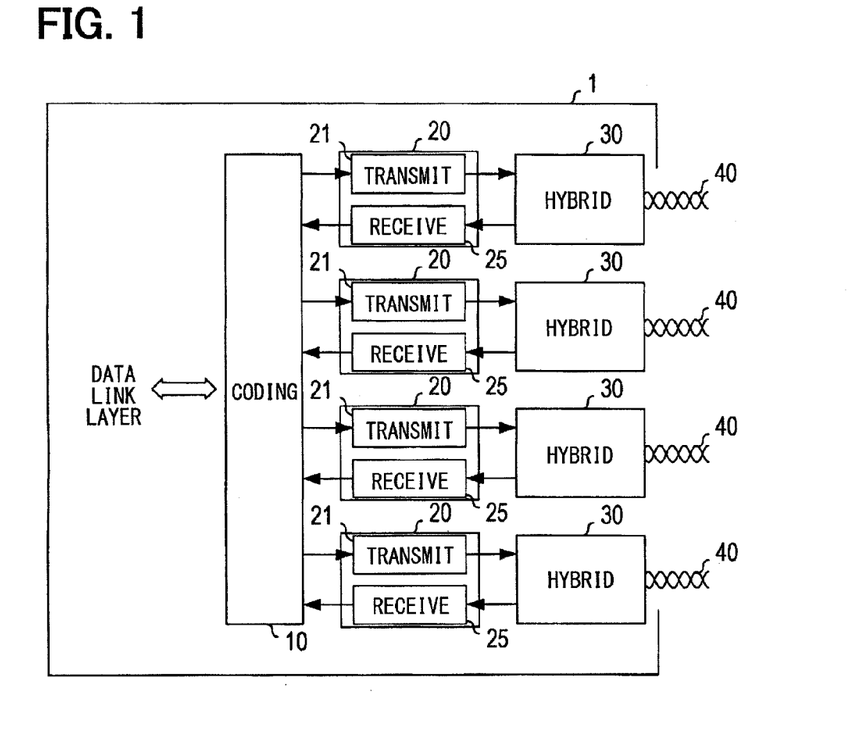
FIG. 1 is a block diagram illustrating a configuration of a communication apparatus according to a first embodiment of the present disclosure.

In detail, with reference to FIG. 1, the communication apparatus 1 includes a coding circuit 10 that functions as a physical coding sublayer (PCS), four transmission and reception circuits 20, and four hybrid circuits 30. Each transmission and reception circuit 20 includes a transmission unit 21 and a reception unit 25.

The coding circuit 10 is connected to the data link layer via the interface (so-called GMII) which connects the data link layer (MAC layer) with the physical layer. The coding circuit 10 encodes transmission target data generated in the data link layer into a four dimensional 5 level symbol constellation ($5^4 = 625$) on an 8-bit basis.

To be specific, the coding circuit 10 converts a transmission target data into four PAM signals corresponding to a four dimensional 5 level symbol constellation according to PAM5 that is one of PAM (Pulse Amplitude Modulation) modes. The generated PAM signals each are a signal indicating multiple values indicating respective different 5 levels of values (amplitudes). The 5 values or 5 levels of values in the following are represented by a numerical group of −2, −1, 0, 1, and 2. The coding circuit 10 inputs the generated four PAM signals into the respectively corresponding transmission units 21 of the transmission and reception circuits 20.

In contrast, the coding circuit 10 receives PAM signals as a reception signal from the reception units 25 of the transmission and reception circuits 20, demodulates the reception signal into a received data (MAC frame), and inputs the received data into the data link layer via the above interface.

In addition, the transmission unit 21 and the reception unit 25 of the transmission and reception circuit 20 is connected to a hybrid circuit 30. The hybrid circuit 30 is connected to the transmission line 40 connected to an external apparatus and realizes full duplex two-way communications with the external apparatus. The reception unit 25 includes an analog-digital converter (unshown); it converts a reception signal (PAM signal), which is from the external apparatus via the hybrid circuit 30, into a digital signal, and inputs the digital signal into the coding circuit 10.

Figure 2:
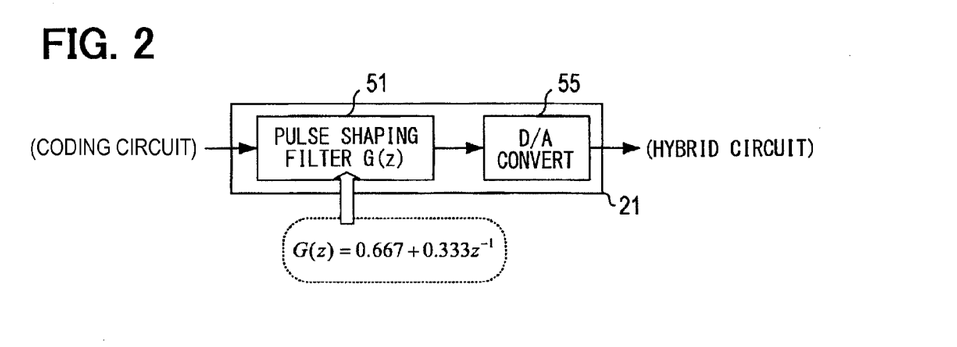
FIG. 2 is a block diagram illustrating a configuration of a transmission unit.

In addition, with reference to FIG. 2, the transmission unit 21 includes a pulse shaping filter 51 and a digital-analog converter 55. The pulse shaping filter 51 applies pulse shaping to the PAM signal inputted or received from the coding circuit 10 for the purpose of reducing inter-symbol interference (ISI) or electromagnetic interference (EMI). This changes a frequency characteristic of the PAM signal. In the present embodiment, the transfer function G(z) of the pulse shaping filter 51 is designated as $G(z) = G1(z) = 0.667 + 0.333 z\hat{}-1$, wherein $z\hat{}-1$ (i.e., $z^{-1}$) is a delay operator.

The general form of the transfer function G1(z) is $G0(z) = (2/3) + (1/3) z\hat{}-1$. In the first embodiment, the transfer function G(z) of the pulse shaping filter 51 is designated as the above transfer function G1(z) that is approximated to the transfer function G0(z).

It is noted that the output signal from the pulse shaping filter 51 is inputted into the digital-analog converter 55 and converted into analog signal; the analog signal is outputted to the transmission line 40. Therefore, if the output signal to the transmission line 40 is substantially identical or equivalent, the pulse shaping filter 51 may be assigned with another transfer function other than the transfer function G0(z) or G1(z). That is, without need to be limited to an input and output relation represented or provided by the transfer function G0(z) or G1(z), the input and output relation of the pulse shaping filter 51 may adopt or use one equivalent to that of the transfer function G0(z).

For instance, the pulse shaping filter 51 may adopt a transfer function $(2+z\hat{}-1)$ that corresponds to a predetermined multiple of the transfer function G0(z). In such adoption of the transfer function $(2+z\hat{}-1)$, the output level adjustment of the PAM signal in the latter stage permits the PAM signal, which is comparable with the PAM signal from the adoption of the transfer function G0(z) or G1(z), to be outputted into the transmission line 40.

The digital-analog converter 55 converts a pulse-shaped PAM signal, which is an output form the pulse shaping filter 51, from a digital signal into an analog signal, and inputs the analog signal into the hybrid circuit 30. The hybrid circuit 30 sends out the above analog signal inputted from the digital-analog converter 55 (i.e., the transmission unit 21), into the transmission line 40.

The following will explain an output value of the pulse shaping filter 51 when the transfer function G(z) is designated as the transfer function $G1(z) = 0.667 + 0.333 z\hat{}-1$. Refer to the upper half of FIG. 3, which indicates output values of the pulse shaping filter 51 using the transfer function $G1(z) = 0.667 + 0.333 z\hat{}-1$ when receiving PAM signals indicating values of −2, −1, 0, 1, and 2 from the coding circuit 10.

Figure 3:
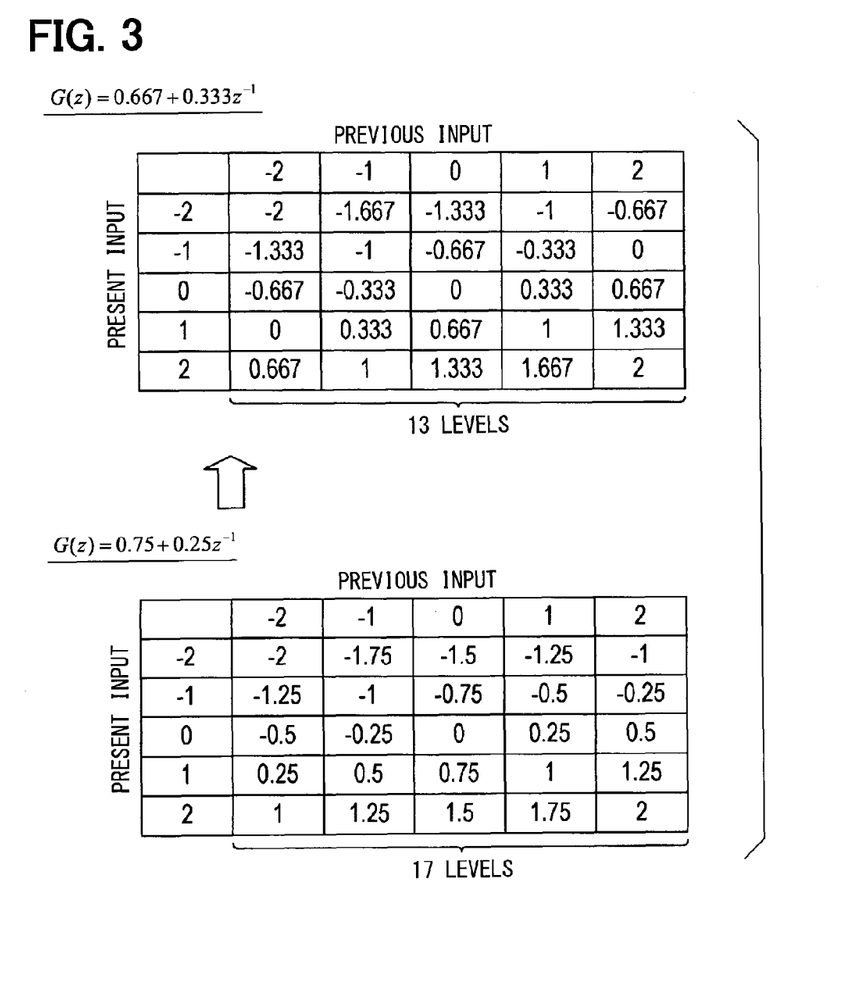
FIG. 3 is a diagram illustrating output values from a pulse shaping filter.

The output value of the pulse shaping filter 51 is determined depending on the combination of the input value at the previous time (i.e., the previous input value) and the input value at the present time (i.e., the present input value). The leftmost first column indicates the input values at the present time; the first row indicates the input values at the previous time. That is, the second row indicates the output values of the pulse shaping filter 51 when the input value at the present time is "−2, and indicates the output values when the input values at the previous time are "−2, −1, 0, 1, and 2."

As understand from the upper half in FIG. 3, the output values of the pulse shaping filter 51 adopting the transfer function G1(z) as the transfer function G(z) provide thirteen different levels (or kinds) of values or thirteen values as follows: −2, −1.667, −1.333, −1, −0.667, −0.333, 0, 0.333, 0.667, 1, 1.333, 1.667, and 2.

In contrast, the output values of the pulse shaping filter 51 adopting a conventional transfer function H(z)=0.75+0.25$z^{-1}$ as the transfer function G(z) are seventeen different values. Refer to the lower half of FIG. 3, which indicates outputs values of the pulse shaping filter 51 adopting the transfer function H(z) when receiving PAM signals indicating values of −2, −1, 0, 1, and 2 from the coding circuit 10.

As indicated in the lower half in FIG. 3, the output values of the pulse shaping filter 51 adopting the transfer function H(z) provide seventeen different levels (kinds) of values or seventeen different values as follows: −2, −1.75, −1.5, −1.25, −1, −0.75, −0.5, −0.25, 0, 0.25, 0.5, 0.75, 1, 1.25, 1.5, 1.75, and 2.

When the output values of the pulse shaping filter 51 indicate 17 levels of values, the latter-stage digital-analog converter 55 is needed to be a converter handling 5 bits (32 gradations). In contrast, under the first embodiment, when the pulse shaping filter 51 adopts the transfer function G1(z) as the transfer function G(z), the latter-stage digital-analog converter 55 is only needed to be a converter handling 4 bits (16 gradations).

Therefore, the first embodiment can reduce the magnitude of a digital-analog converter 55 and the magnitude of a circuit of the physical layer chip of the communication apparatus 1.

Figure 4:
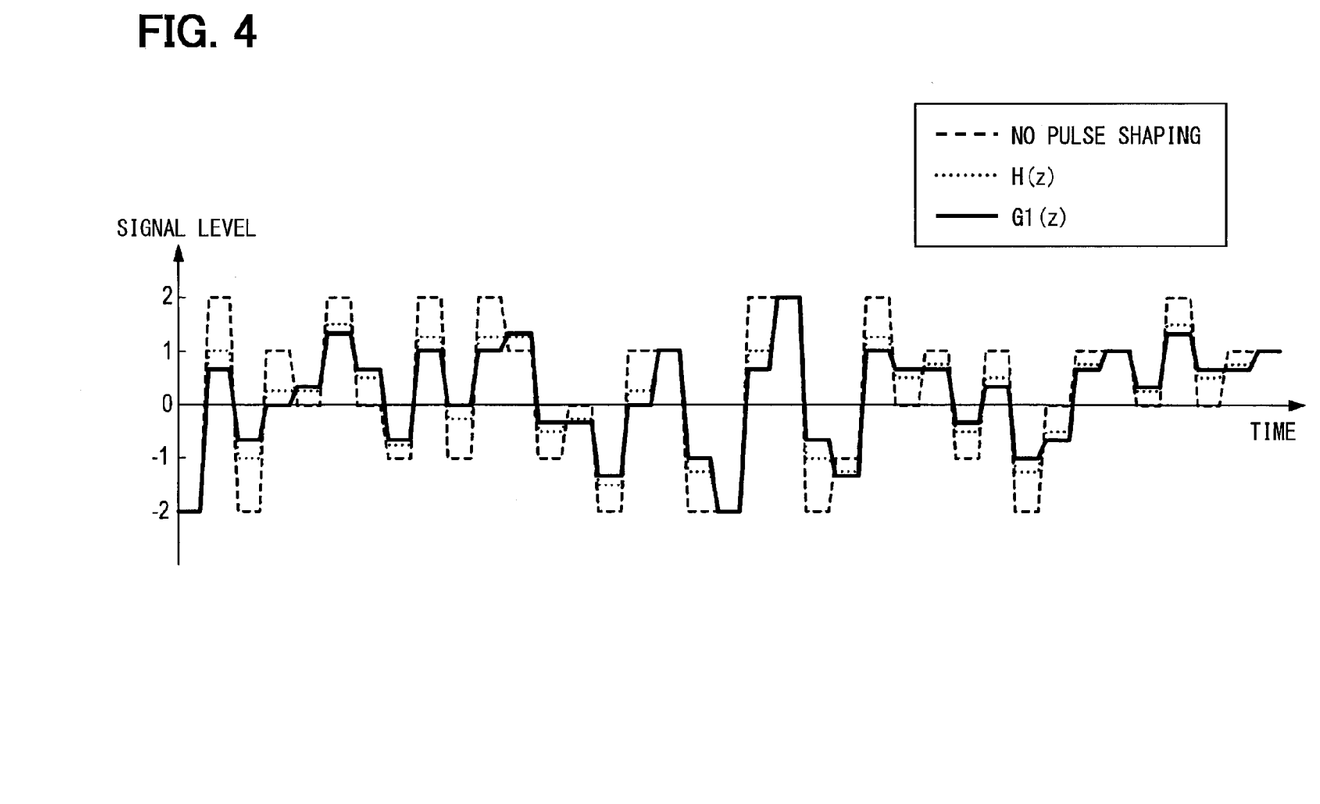
FIG. 4 is a diagram illustrating waveforms of PAM signals.

Furthermore, a pulse-shaped PAM signal that is a PAM signal after having undergone the pulse shaping with the above transfer function G1(z) can reduce a peak level of an isolated pulse as compared with a pulse-shaped PAM signal with the transfer function H(z) or a PAM signal without pulse shaping. With reference to FIG. 4, the solid line indicates a PAM signal after pulse shaping with the transfer function G1(z), whereas the dotted line indicates a PAM signal after pulse shaping with transfer function H(z). In addition, the broken line indicates a PAM signal that does not undergo any pulse shaping. The reduction of the peak level leads to the reduction of the peak level of the high frequency component and, thus, is useful for the reduction of EMI.

Figure 5:
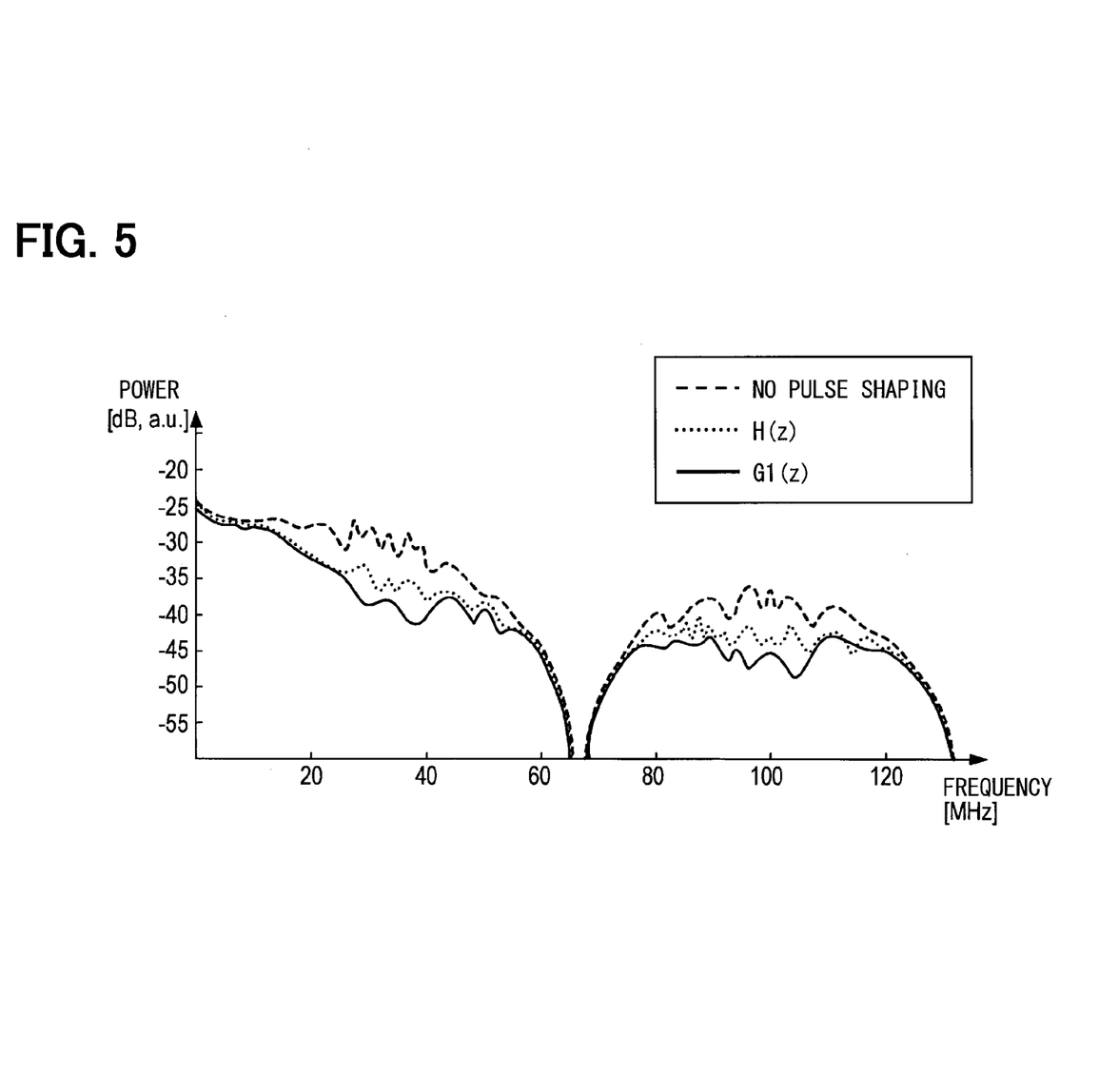
FIG. 5 is a diagram schematically illustrating frequency spectra of PAM signals.

Refer to FIG. 5 that indicates schematically frequency spectra of output signals of the digital-analog converter 55 at a symbol rate of 125 MS/s. In FIG. 5, the solid line indicates a PAM signal after pulse shaping with the transfer function G1(z), whereas the dotted line indicates a PAM signal after pulse shaping with the transfer function H(z). In addition, the broken line indicates a PAM signal that does not undergo any pulse shaping. The frequency spectra adopting the transfer function G1(z) as the transfer function G(z) exhibits a gently curve as compared with that adopting the transfer function H(z). In other words, the frequency spectra adopting the transfer function G1(z) exhibits a mountain shape of which a peak is lower than a peak of a mountain shape exhibited by tha frequency spectra adopting the transfer function H(z). Therefore, the first embodiment can enhance the reduction effect of EMI using the pulse shaping filter 51 as compared with a conventional one.

First Modification Example

Figure 6:
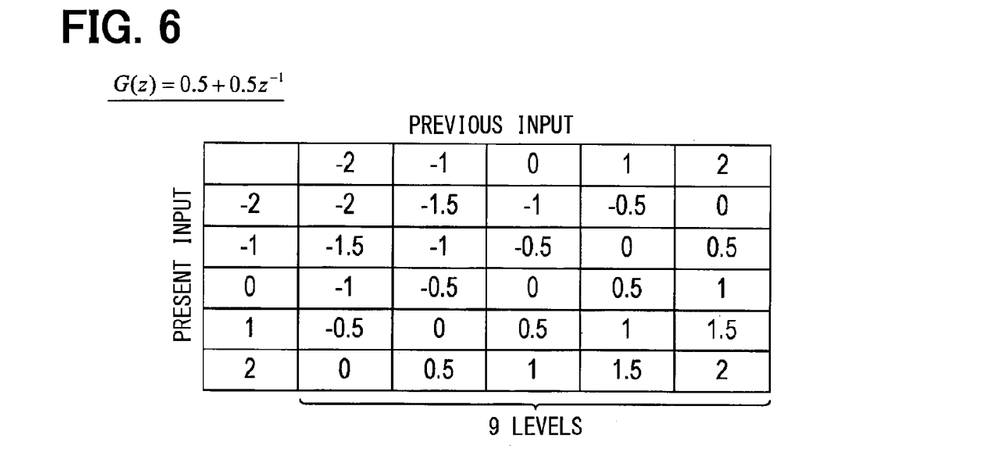
FIG. 6 is a diagram illustrating output values from a pulse shaping filter according to a first modification example.

The first embodiment adopts G1(z)=0.667+0.333$z^{-1}$ as the transfer function G(z) of the pulse shaping filter 51. The transfer function G(z) of the pulse shaping filter 51 may be designated as G2(z)=0.5+0.5$z^{-1}$. When the transfer function G2(z) is adopted in the pulse shaping filter 51, the output values of the pulse shaping filter 51 can be reduced to nine levels (kinds) of values or nine values as follows: 2, −1.5, −1, −0.5, 0, 0.5, 1, 1.5, and 2.

It is noted that the use or adoption of the transfer function G2(z) causes an output value of the pulse shaping filter 51 to be zero when the input value at the previous time and the input value at the present time are identical in an absolute value but reverse in positive and negative such as 1 versus −1 or 2 versus −2. In addition, when the input values switch between two values such as 2, 1, 2, 1, . . . , the output value of the pulse shaping filter 51 exhibits continuously an average value such as 1.5. This often extinguishes a pulse in a PAM signal after pulse shaping. This may affect a reception process. Therefore, it may be sometimes preferable to adopt G1(z) rather than G2(z) as the transfer function G(z).

Second Modification Example

The first embodiment explains the communication apparatus 1 that converts transmission target data into PAM signals according to PAM5 mode. The transfer functions G0(z), G1(z) or a transfer function equivalent thereto may be used for a communication apparatus that converts a transmission target data into PAM signals indicating three different levels of values according to PAM3 mode.

Figure 7:
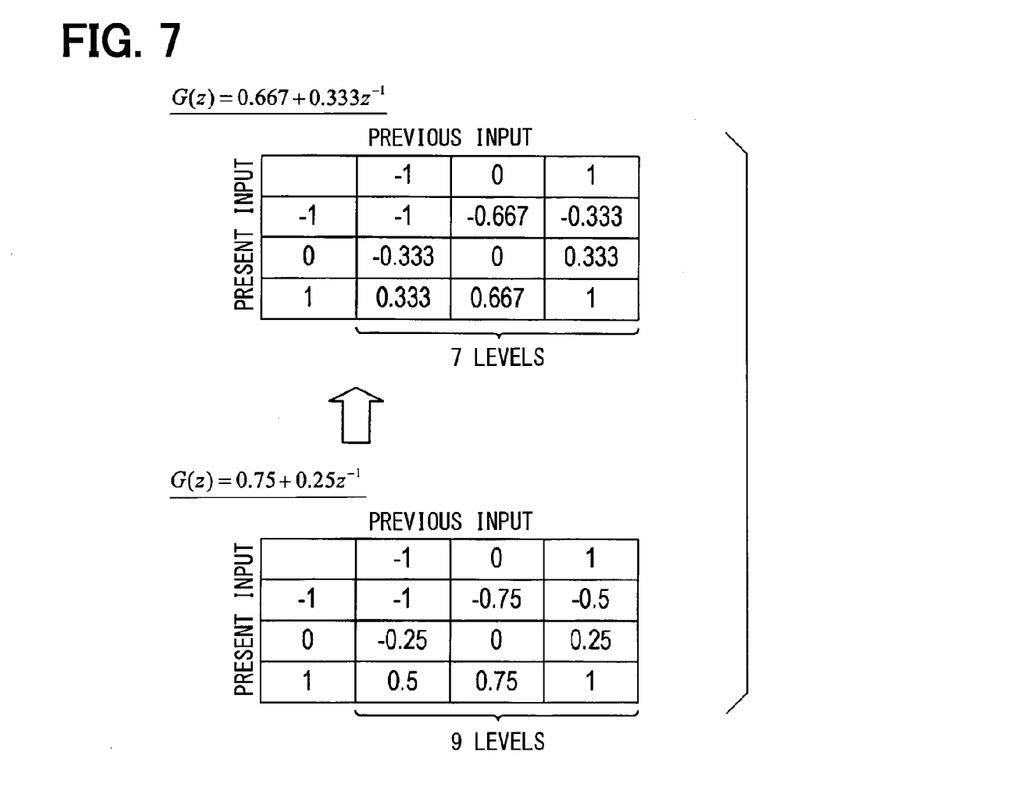
FIG. 7 is a diagram illustrating output values from a pulse shaping filter according to a second modification example.

In PAM3 mode, a pulse shaping filter 51 receives a PAM signal indicating three levels of values, e.g., −1, 0, 1. Refer to FIG. 7 that indicates the output values of the pulse shaping filter 51 that generates PAM signals according to PAM3 mode. The upper half in FIG. 7 indicates the output values of the pulse shaping filter 51 adopting the transfer function G1(z)=0.667+0.333$z^{-1}$. The lower half in FIG. 7 indicates the output values of the pulse shaping filter 51 adopting the conventional transfer function H(z)=0.75+0.25$z^{-1}$, instead of adopting the transfer function G1(z).

As understood from FIG. 7, the use of the conventional transfer function H(z) provides the output values indicating nine levels (kinds) of values. In contrast, the use of the transfer function G1(z) provides the output values indicating seven levels of values. Therefore, the use of the transfer function G1(z) can reduce the number of bits of the digital-analog converter 55 from 4 bits to 3 bits as compared with the use of the conventional transfer function H(z); this can reduce the magnitude of a circuit of the communication apparatus.

Third Modification Example

The first embodiment explains the communication apparatus 1 that converts transmission target data into PAM signals according to PAM5 mode. The transfer functions G0(z), G1(z) or a transfer function equivalent thereto may be used for a communication apparatus that converts a transmission target data into PAM signals having four different levels of values according to PAM4 mode.

Figure 8:
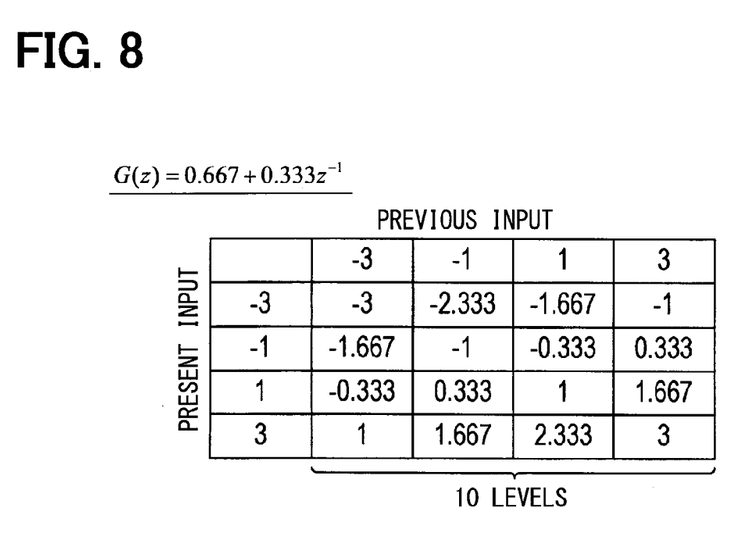
FIG. 8 is a diagram illustrating output values from a pulse shaping filter according to a third modification example.

In PAM4 mode, a pulse shaping filter 51 receives a PAM signal indicating four levels of values, e.g., −3, −1, 1, 3. Refer to FIG. 8 that indicates the output values of the pulse shaping filter 51 that generates PAM signals according to PAM4 mode. The pulse shaping filter 51 performs a pulse shaping of the PAM signals with the transfer function $G1(z)=0.667+0.333z^{-1}$, and provides the output values of ten levels of values, which requires the digital-analog converter 55 to handle the bit number of 4 bits.

In contrast, the use of the conventional transfer function $H(z)$ provides the output values indicating thirteen levels of values, which requires the digital-analog converter 55 to also handle the bit number of 4 bits. Thus, the use of the transfer function $G1(z)$ under the PAM4 mode cannot decrease the bit number of the digital-analog converter 55 from 4 bits that is the same as that of the use the conventional transfer function $H(z)$ under the PAM4 mode; however, the effect of EMI reduction is acquired.

Other Embodiments

The above transfer function $G1(z)$ may be adopted or used in any kind of communication apparatus that generates a transmission signal according to a PAM mode, without need to be limited to the communication apparatus 1 according to a standard of Ethernet (registered trademark). In addition, the above transfer function $G2(z)=0.5+0.5z^{-1}$ may be adopted in a pulse shaping filter 51 of a communication apparatus according to a PAM4 mode or PAM3 mode.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A communication apparatus comprising:
a generation unit to generate PAM (Pulse Amplitude Modulation) signals that indicate a plurality of different levels of values corresponding to data of a transmission target;
a pulse shaping filter to receive an input that is the PAM signals generated by the generation unit and provide an output that is pulse-shaped PAM signals that correspond to the input of the PAM signals from the generation unit; and
a converter to convert the pulse-shaped PAM signals from the pulse shaping filter into analog signals and provide the analog signals to a transmission line connected to an external apparatus,
wherein the pulse shaping filter causes the converter to handle a reduced number of gradations by providing the output that is the pulse-shaped PAM signals corresponding to the input of the PAM signals from the generation unit according to one of two input and output relations that are a first input and output relation and a second input and output relation,
the first input and output relation being provided by a transfer function $G(z)=(2/3)+(1/3)z^{-1}$ ($z^{-1}$ being a delay operator),
the second input and output relation being equivalent to the first input and output relation provided by the transfer function $G(z)=(2/3)+(1/3)z^{-1}$, wherein:
the generation unit generates the PAM signals that indicate five different levels of values according to a PAM5 mode as the PAM signals corresponding to the data of the transmission target;
the pulse-shaping filter provides the pulse-shaped PAM signals with thirteen levels of output values; and
the converter is provided to handle up to sixteen gradations corresponding to four bits.

2. A communication apparatus comprising:
a generation unit to generate PAM (Pulse Amplitude Modulation) signals that indicate a plurality of different levels of values corresponding to data of a transmission target;
a pulse shaping filter to receive an input that is the PAM signals generated by the generation unit and provide an output that is pulse-shaped PAM signals that correspond to the input of the PAM signals from the generation unit; and
a converter to convert the pulse-shaped PAM signals from the pulse shaping filter into analog signals and provide the analog signals to a transmission line connected to an external apparatus,
wherein the pulse shaping filter causes the converter to handle a reduced number of gradations by providing the output that is the pulse-shaped PAM signals corresponding to the input of the PAM signals from the generation unit according to one of two input and output relations that are a first input and output relation and a second input and output relation,
the first input and output relation being provided by a transfer function $G(z)=(2/3)+(1/3)z^{-1}$ ($z^{-1}$ being a delay operator),
the second input and output relation being equivalent to the first input and output relation provided by the transfer function $G(z)=(2/3)+(1/3)z^{-1}$, wherein:
the generation unit generates the PAM signals that indicate four different levels of values according to a PAM4 mode as the PAM signals corresponding to the data of the transmission target;
the pulse-shaping filter provides the pulse-shaped PAM signals with ten levels of output values with electromagnetic interference reduced; and
the converter is provided to handle up to sixteen gradations corresponding to four bits.

3. A communication apparatus comprising:
a generation unit to generate PAM (Pulse Amplitude Modulation) signals that indicate a plurality of different levels of values corresponding to data of a transmission target;
a pulse shaping filter to receive an input that is the PAM signals generated by the generation unit and provide an output that is pulse-shaped PAM signals that correspond to the input of the PAM signals from the generation unit; and
a converter to convert the pulse-shaped PAM signals from the pulse shaping filter into analog signals and provide the analog signals to a transmission line connected to an external apparatus,
wherein the pulse shaping filter causes the converter to handle a reduced number of gradations by providing the output that is the pulse-shaped PAM signals corresponding to the input of the PAM signals from the generation unit according to one of two input and output relations that are a first input and output relation and a second input and output relation, the first input and output relation being provided by a transfer function $G(z)=(2/3)+(1/3)z^{-1}$ ($z^{-1}$ being a delay operator), the second input and output relation being equivalent to the first input and output relation provided by the transfer function $G(z)=(2/3)+(1/3)z^{-1}$, wherein:

the generation unit generates the PAM signals that indicate three different levels of values according to a PAM3 mode as the PAM signals corresponding to the data of the transmission target;

the pulse-shaping filter provides the pulse-shaped PAM signals with seven levels of output values; and the converter is provided to handle up to eight gradations corresponding to three bits.

4. The communication apparatus according to claim 3, wherein the second input and output relation includes an input and output relation provided by one of two transfer functions that are
 (i) a transfer function $(2+z^{-1})$ and
 (ii) a transfer function being a multiple of the transfer function $G(z)=(2/3)+(1/3)z^{-1}$ other than the transfer function $(2+z^{-1})$.

5. A communication apparatus comprising:

a generation unit to generate PAM (Pulse Amplitude Modulation) signals that indicate a plurality of different levels of values corresponding to data of a transmission target;

a pulse shaping filter to receive an input that is the PAM signals generated by the generation unit and provide an output that is pulse-shaped PAM signals that correspond to the input of the PAM signals from the generation unit; and a converter to convert the pulse-shaped PAM signals from the pulse shaping filter into analog signals and provide the analog signals to a transmission line connected to an external apparatus, wherein the pulse shaping filter causes the converter to handle a reduced number of gradations by providing the output that is the pulse-shaped PAM signals corresponding to the input of the PAM signals from the generation unit according to one of two input and output relations that are a first input and output relation and a second input and output relation, the first input and output relation being provided by a transfer function $G(z)=0.5+0.5z^{-1}$ ($z^{-1}$ being a delay operator), the second input and output relation being equivalent to the first input and output relation provided by the transfer function $G(z)=0.5+0.5z^{-1}$, wherein the generation unit generates the PAM signals that indicate five different levels of values according to a PAM5 mode as the PAM signals corresponding to the data of the transmission target;

the pulse-shaping filter provides the pulse-shaped PAM signals with nine levels of output values; and the converter is provided to handle up to sixteen gradations corresponding to four bits.

* * * * *